(12) United States Patent
Kogure et al.

(10) Patent No.: US 7,003,552 B2
(45) Date of Patent: Feb. 21, 2006

(54) INFORMATION PROCESSING APPARATUS AND CONTROL METHOD THEREFOR

(75) Inventors: Shinya Kogure, Ibaraki (JP); Yutaka Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 569 days.

(21) Appl. No.: 10/173,588

(22) Filed: Jun. 19, 2002

(65) Prior Publication Data

US 2004/0215349 A1  Oct. 28, 2004

(30) Foreign Application Priority Data

Jun. 25, 2001 (JP) ............................. 2001-191093
Jun. 25, 2001 (JP) ............................. 2001-191094

(51) Int. Cl.
  *G06F 15/16*  (2006.01)
(52) U.S. Cl. ............. 709/206; 709/203; 709/208; 709/225; 709/227; 455/412.1; 455/412.2; 358/1.15
(58) Field of Classification Search ................ 709/203, 709/206, 227; 455/412.1, 412.2; 358/1.15
See application file for complete search history.

(56) References Cited

U.S. PATENT DOCUMENTS

| 6,161,140 A | 12/2000 | Moriya | 709/228 |
|---|---|---|---|
| 6,289,212 B1 * | 9/2001 | Stein et al. | 455/412.1 |
| 6,493,105 B1 * | 12/2002 | Onuma | 358/1.15 |
| 6,636,733 B1 * | 10/2003 | Helferich | 455/412.2 |

FOREIGN PATENT DOCUMENTS

| JP | 2000115440 A | 4/2000 |
|---|---|---|
| WO | WO 99/00968 A | 1/1999 |
| WO | WO 99/13663 A | 3/1999 |

OTHER PUBLICATIONS

T. Gray, "Comparing Two Approaches to Remote Mailbox Access: IMAP vs POP", XP002244744, http://www.i-map.org/imap.vs.pop.brief, Nov. 5, 1993.

* cited by examiner

*Primary Examiner*—Ario Etienne
*Assistant Examiner*—Yves Dalencourt
(74) *Attorney, Agent, or Firm*—Fitzpatrick, Cella, Harper & Scinto

(57) ABSTRACT

To easily change the specifications of a subsidiary device without changing a system unit, an information processing apparatus includes a slave control unit for controlling a slave device and a system control unit for receiving email from an external line and storing and managing the email. In transmitting email information to the slave device, email information stored in the system control unit is temporarily stored in the slave control unit and then transmitted to the slave device, improving information transmission efficiency.

7 Claims, 6 Drawing Sheets

FIG. 6

| | | | | | | |
|---|---|---|---|---|---|---|
| UNREAD | kogure@ooo.co.jp | MATTER OF YESTERDAY | 03/06 10:00 | →| | 03/06 10:00 |
| UNREAD | kogure@ooo.co.jp | MATTER OF TOMORROW | 03/05 17:45 | → | | kogure@ooo.co.jp |
| READ | inoue@abc.ne.jp | MATTER OF NEXT WEEK | 03/05 12:34 | → | | MATTER OF YESTERDAY |
| READ | ken@ghi.co.jp | GOOD EVENING | 03/03 22:33 | → | | ------- |
| READ | yutaka@ghi.com | HOW DO YOU DO? | 03/01 16:54 | → | | HELLO |
| | | | NULL | | | |
| | | | | | | 03/05 17:45 |
| | | | | | | kogure@ooo.co.jp |
| | | | | | | MATTER OF TOMORROW |
| | | | | | | ------- |
| | | | | | | GOOD EVENING DON'T FORGET TOMORROW. |
| | | | | | | 03/05 12:34 |
| | | | | | | inoue@abc.ne.jp |
| | | | | | | MATTER OF NEXT WEEK |
| | | | | | | ------- |
| | | | | | | ABOUT NEXT WEEK. LET'S MEET AT THE USUAL PLACE. | ism
INFORMATION PROCESSING APPARATUS AND CONTROL METHOD THEREFOR

FIELD OF THE INVENTION

The present invention relates to an information processing apparatus which receives mail through a line and browses the received mail with a slave device and a control method therefor.

BACKGROUND OF THE INVENTION

Along with recent developments in information communication technology, email is explosively proliferating. Email can be transmitted/received or browsed not only by PCs but also by various kinds of terminals, and consequently mail terminals in various forms have been developed.

In particular, products that can send and receive email even at a cordless home telephone terminal have been developed. In addition, products capable of transmitting/receiving or browsing email not only at a master device but also at a cordless subsidiary device have been developed.

A facsimile terminal is also used as an information communication device. Recently, home facsimile terminals with cordless telephones are becoming popular and replacing cordless telephones. When this facsimile terminal is applied to a mail terminal, a data output function (such as a printing function) and a data input function (such as a reading function) of the facsimile terminal are added. Mail can be output or an image to be attached to mail can be input. This improves the function of the terminal.

However, the product cycle of such home information terminals is very short because the information communication technology is making very rapid progress.

Therefore, in developing an information terminal with a short cycle on such a background, the product must be efficiently launched in a short period. In order to achieve such shortened launches, the product must be one that can be used in a variety of different forms by modularizing its interval components, employing unit components, or replacing the units.

However, at such a terminal, when mail information managed by a master device is to be browsed at a cordless subsidiary device, the master device must transfer the mail information to the cordless subsidiary device divisionally in many pieces because the cordless subsidiary device has a small storage capacity. In short, data transmission is inefficient.

In transmitting data with a large capacity from the master device to the subsidiary device, the subsidiary device must be managed. More specifically, the master device must divisionally transmit data, or the subsidiary device must estimate the necessary data capacity. This requirement impedes a terminal from using unit components.

In addition, when the master device transfers mail information to the subsidiary device divisionally in many pieces, this processing increases the load on the master device and hampers processing that the master device can do alone.

Furthermore, in the master and subsidiary devices with distributed functions, when data managed by the master device is to be browsed at the subsidiary device, information browsed at the subsidiary device and that stored and managed at the master device may sometimes be different.

SUMMARY OF THE INVENTION

It is an object of the present invention to provide an information processing apparatus that can easily exchange a slave device and change its specifications even when the specifications are changed, and a control method therefor.

It is another object of the present invention to provide an information processing apparatus that can prevent any inconsistency between window display and actual status at a slave device, and a control method therefor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view showing a method of storing data in the communication system of the embodiment.

DETAILED DESCRIPTION OF THE PREFERRED EMBODIMENT

Figure 1:
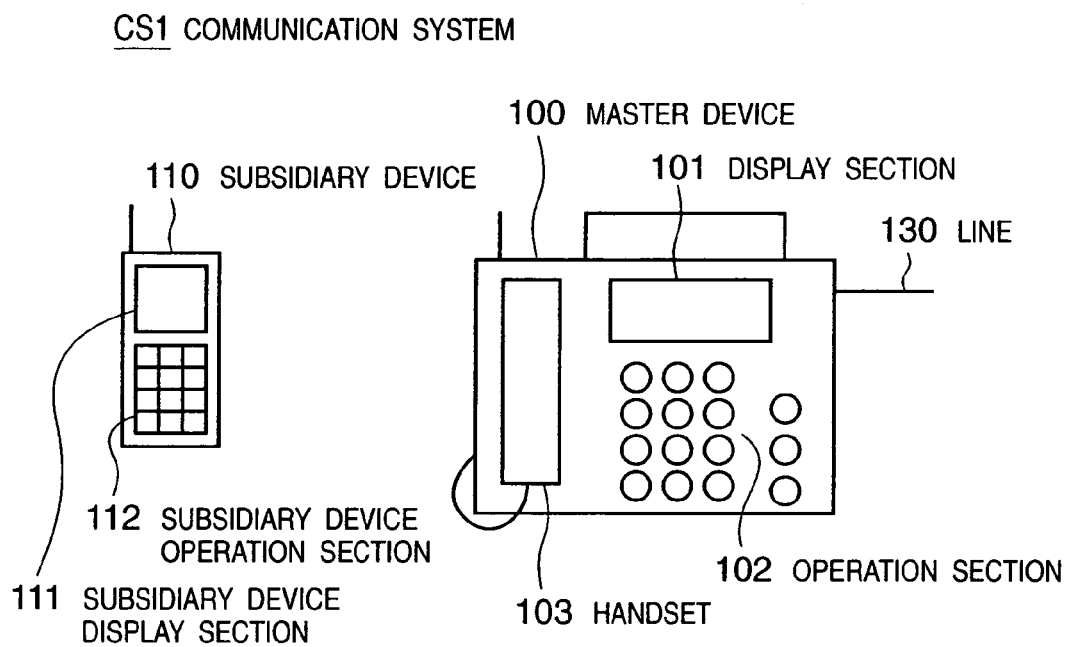
FIG. 1 is a view showing a schematic arrangement of a communication system CS1 according to an embodiment of the present invention.

FIG. 1 is a view showing the schematic arrangement of a communication system CS1 according to an embodiment of the present invention.

The communication system CS1 has a facsimile apparatus master device 100, a facsimile apparatus subsidiary device 110, and a line 130.

The facsimile apparatus master device 100 has a display section 101 of the master device, an operation section 102 of the master device, and a handset 103.

The line 130 connects the master device to a public line.

The facsimile apparatus subsidiary device 110 has a display section 111 and an operation section 112.

Figure 2:
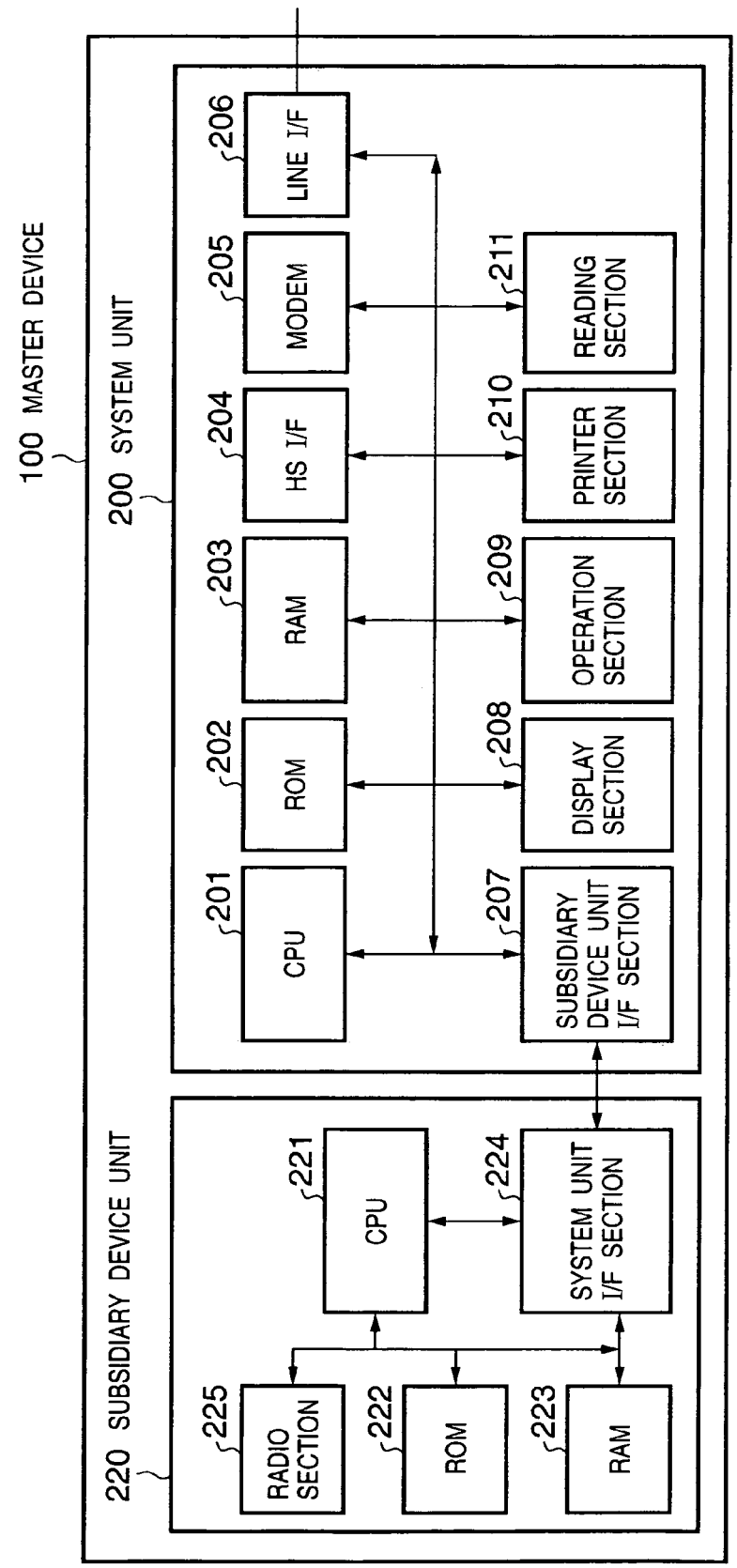
FIG. 2 is a block diagram showing the internal arrangement of a master device 100 in the embodiment.

FIG. 2 is a block diagram showing the internal arrangement of the master device 100 in the embodiment.

The master device 100 has a system unit 200 and subsidiary device unit 220.

The system unit 200 controls the master device and line. The system unit 200 has a CPU 201, a ROM 202, a memory 203, an interface section 204 to the handset, a modem 205, a line interface section 206, an interface section 207 to the subsidiary device unit, a display section 208, an operation section 209, a printer section 210, and a reading section 211.

The subsidiary device unit 220 controls sections related to the subsidiary device. The subsidiary device unit 220 has a CPU 221, a ROM 222, a memory 223, an interface section 224 to the system unit 200, and a radio control section 225 to the subsidiary device.

Mail transmission/reception and management are done by the system unit 200.

In receiving mail, the CPU 201 connects the line to a mail server through the line interface section 206. Data is transmitted/received by the modem 205 and stored in the memory 203 as newly received mail.

In addition, the received mail list is changed in accordance with the stored newly received mail information.

During this time, the subsidiary device unit 220 performs no operation related to mail.

Figure 3:
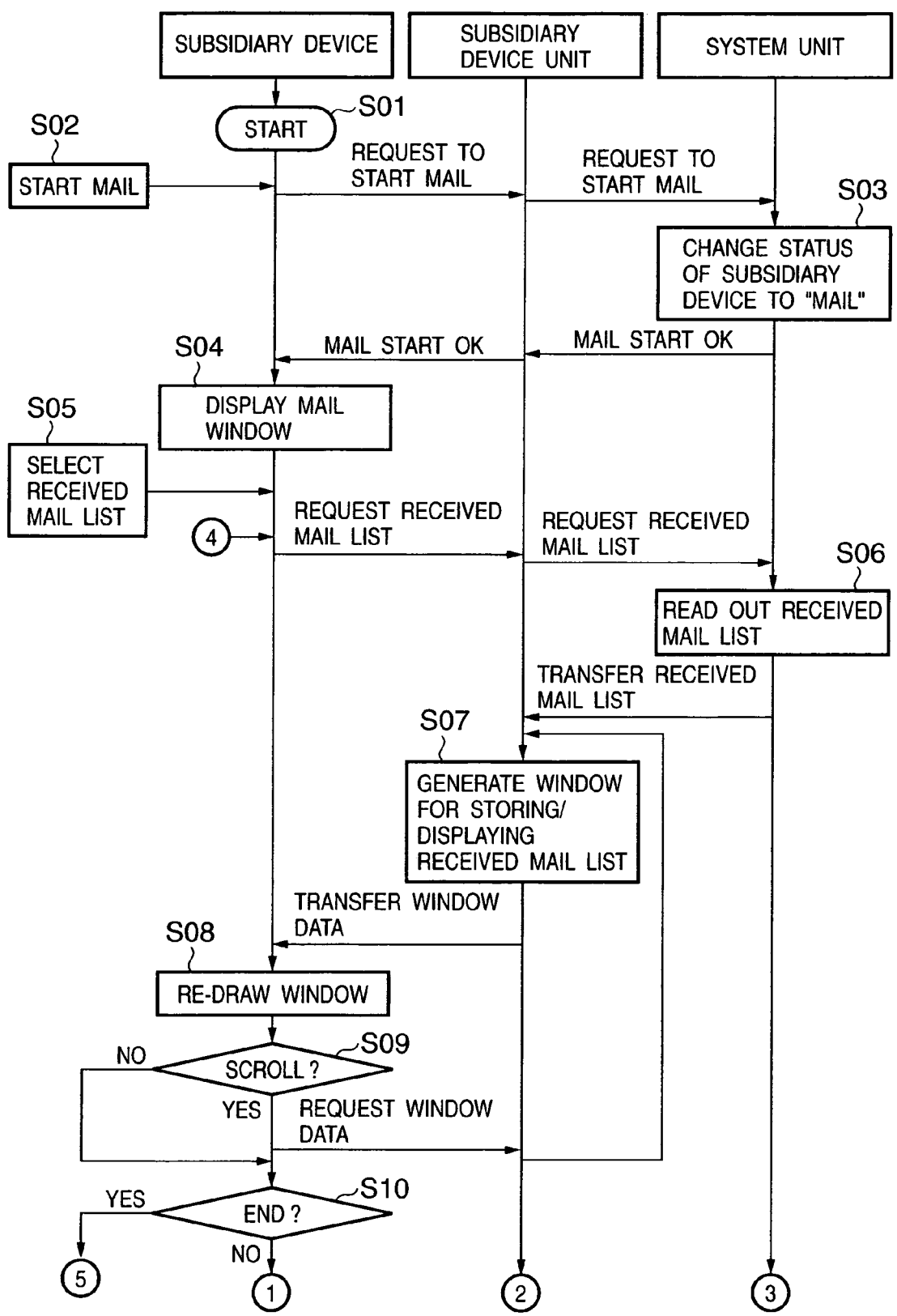
FIG. 3 is a flow chart showing steps in the operation of causing a subsidiary device to execute mail operation in the embodiment.
Figure 4:
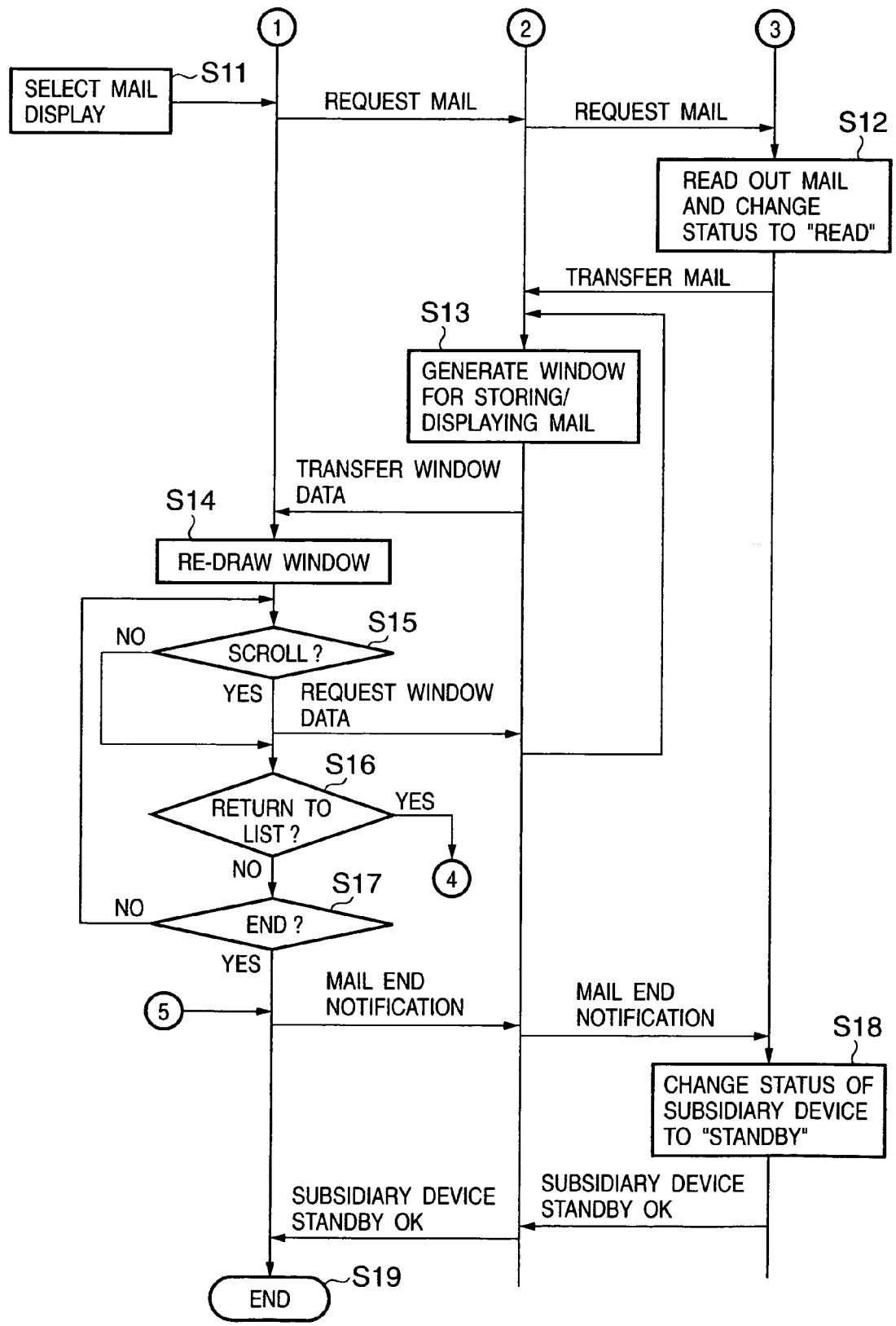
FIG. 4 is a flow chart showing steps in the operation of causing the subsidiary device to execute mail operation in the embodiment.

FIGS. 3 and 4 are flow charts showing steps in the operation of causing the subsidiary device to execute mail operation in the embodiment.

Figure 5:
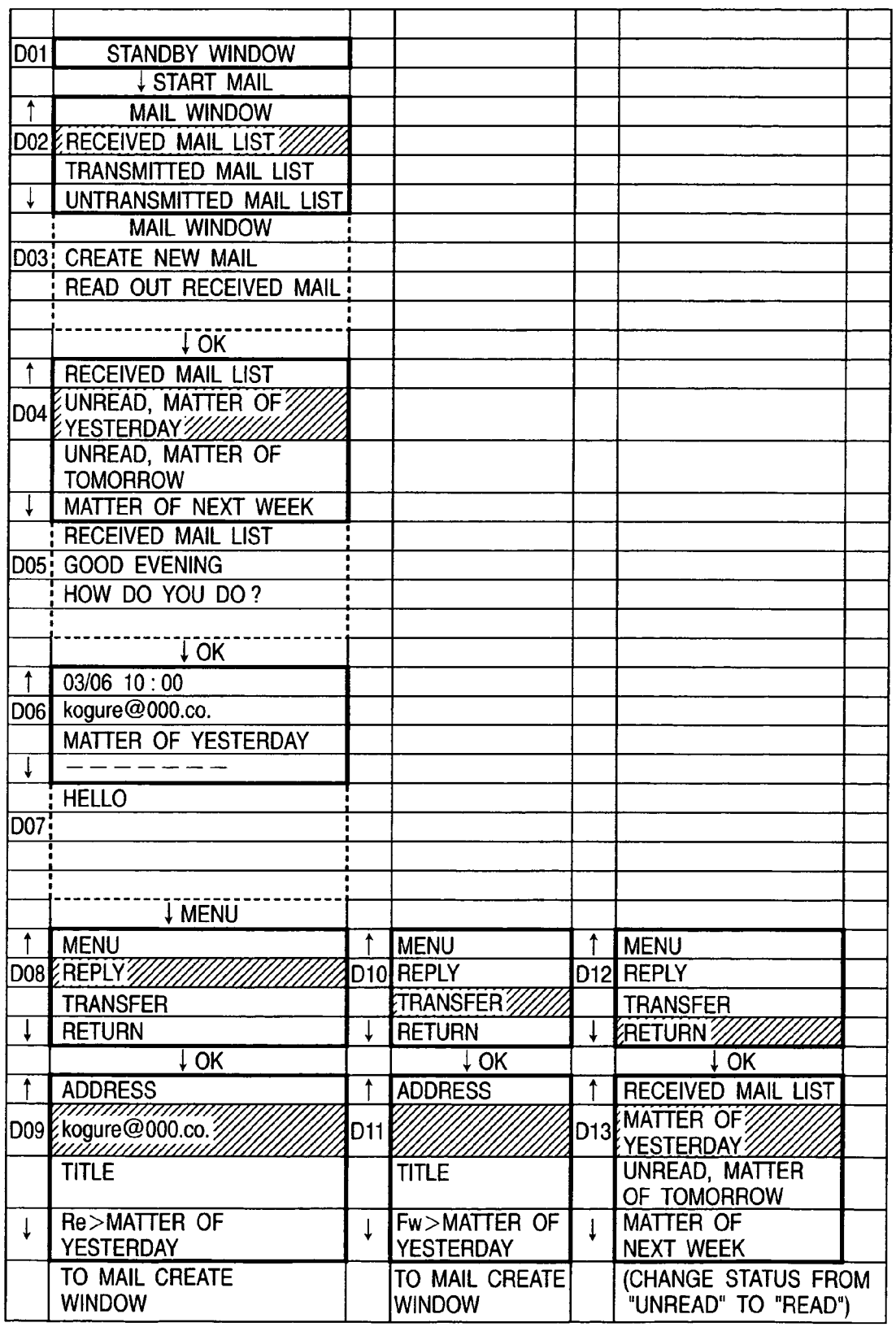
FIG. 5 is an explanatory view corresponding to the operation of causing the subsidiary device 110 to execute mail operation in the embodiment.

FIG. 5 is an explanatory view corresponding to the operation of causing the subsidiary device 110 to execute mail operation in the embodiment.

When the subsidiary device 110 (S01) which is displaying a standby window (D01) is instructed to start mail operation (S02), the subsidiary device 110 issues a mail start request to the system unit 200 through the subsidiary device unit 220 to check whether mail operation can be executed by the subsidiary device 110 and notify the subsidiary device 110 that the subsidiary device 110 should be busy for mail communication.

The system unit 200 checks whether the subsidiary device 110 can execute mail operation. If the subsidiary device can do mail operation, the system unit 200 changes the status of the subsidiary device 110 to "mail communication" and returns "mail start OK" (S03). If the subsidiary device 110 cannot execute mail operation, the system unit 200 returns "mail start NG" through the subsidiary device unit 220. The subsidiary device 110 returns to the standby state.

Upon receiving "mail start OK", the subsidiary device 110 displays a mail window (D02) stored in the subsidiary device 110 (S04). When the window is scrolled, a scrolled window (D03) is read out and displayed in the subsidiary device 110.

The user selects a displayed item using the operation section 112. A case wherein a received mail list is selected (S05) will be described here.

When the received mail list is selected, the subsidiary device 110 requests the received mail list of the system unit 200 through the subsidiary device unit 220. The system unit 200 reads out received mail list data stored in the master device 100 (S06) and transfers the data to the subsidiary device unit 220. The data is stored in the subsidiary device unit 220.

In the subsidiary device unit 220, the received mail list data is processed to generate image data in accordance with the drawing capability of the subsidiary device 110 (S07), and the image data is transferred to the subsidiary device 110. The subsidiary device 110 draws the transferred data on the window (S08, D04). When the window is scrolled in the subsidiary device 110 (S09), the subsidiary device 110 requests a new display image of the subsidiary device unit 220. The subsidiary device unit 220 generates image data (S07) and transfers it to the subsidiary device 110. The subsidiary device 110 draws the transferred data on the window (S08, D05). During this time, the system unit 200 executes no operation related to mail for the subsidiary device 110.

When received mail to be displayed is selected (S11), the subsidiary device 110 requests the received mail of the system unit 200 through the subsidiary device unit 220. The system unit 200 reads out received mail data stored in the master device 100. If the mail is unread, the status is changed to "read" (S12). The received mail data is transferred to and stored in the subsidiary device unit 220.

In the subsidiary device unit 220, the received mail data is processed to generate image data in accordance with the drawing capability of the subsidiary device 110 (S13), and the image data is transferred to the subsidiary device 110. The subsidiary device 110 draws the transferred data on the window (S14, D06). When the window is scrolled in the subsidiary device 110 (S15), the subsidiary device 110 requests a new display image of the subsidiary device unit 220. The subsidiary device unit 220 generates image data (S13) and transfers it to the subsidiary device 110. The subsidiary device 110 draws the transferred data on the window (S14, D07).

During this time, the system unit 200 executes no operation related to mail for the subsidiary device 110.

When operation of returning received mail display to received mail list display is executed (S16, D12), the subsidiary device 110 requests the received mail list of the system unit 200 through the subsidiary device unit 220. The system unit 200 reads out the received mail list data stored in the master device 100 (S06) and transfers the data to the subsidiary device unit 220. The data is stored in the subsidiary device unit 220. Image data is generated (S07) and the transferred to the subsidiary device 110. The subsidiary device 110 draws the transferred data on the window (S08, D13).

Since the system unit 200 reads out the received mail list data whose status has already been changed, the subsidiary device 110 can always display the latest correct data.

When an end of mail operation of the subsidiary device 110 is selected (S10, S17), the subsidiary device 110 notifies the system unit 200 of the end of mail through the subsidiary device unit 220. The system unit 200 changes the status of the subsidiary device 110 to "standby" and returns "standby OK" to the subsidiary device 110 (S18). Upon receiving "subsidiary device standby OK", the subsidiary device 110 displays the standby window (D01) and ends email operation (S19).

FIG. 6 is a view showing a method of storing data in the communication system of the embodiment.

In the communication system, mail is stored in the memory 203 of the master device system unit 200 and managed.

To manage mail, a list file in which information of each mail item is described is prepared as well as mail text. The list file is formed from the status, destination/transmission source, subject, date, and the like of each mail item. To refer to each mail text, the address of storage position or size described in the list is used.

According to the embodiment, mail data is transferred from the system unit 200 to the subsidiary device unit 220. Until another data is required, display window generation or display operation is done only between the subsidiary device unit 220 and the subsidiary device 110. During this time, the system unit 200 does not operate. For this reason, even when the specifications of the subsidiary device 110 are changed, the system unit 200 need not be changed. Hence, the specifications can easily be adapted as required.

According to the embodiment, the interface related to subsidiary device mail is separated from those for the remaining operations. Hence, status management or event management is easy.

According to the embodiment, specific mail information can be managed in a closed world of a slave terminal and slave terminal control unit. The slave terminal control unit can be clearly separated from the main body. Hence, a flexible product can be developed.

Additional advantages also accrue from the above-described flexible arrangement. Thus, according to the embodiment, any inconsistency between window display and actual status on the subsidiary device side can be prevented.

Moreover, since the status is managed at one section, management is easy.

The subsidiary device 110 may have a telephone function or may be a device dedicated to mail browsing. The subsidiary device 110 only needs to be accommodated in the master device 100.

The master device 100 only needs to receive email through the line and accommodate the subsidiary device.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus having a system control unit that receives email through a line and stores and manages the email and a slave control unit that controls communication with a slave apparatus, the information processing apparatus comprising:
    a storage device included in the slave control unit, adapted to store, in the slave control unit, a list of email stored in the system control unit in accordance with a request from the slave apparatus, the list of email comprising information which shows whether mail text has already been read or is unread;
    a list transmission device included in the slave control unit, adapted to transmit the list stored by said storage device from the slave control unit to the slave apparatus;
    a request device included in the slave control unit, adapted to request, to the system control unit, transmission of mail text;
    a mail text transmission device included in the system control unit, adapted to transmit corresponding mail text to the slave control unit in accordance with a request by said request device; and
    a management device included in the system control unit, adapted to manage corresponding mail as a state of already having been read when the corresponding mail text is transmitted by mail text transmission device,
    wherein the system control unit and the slave control unit are installed in the same housing.

2. The apparatus according to claim 1, wherein in transmitting the list stored in the slave control unit to the slave apparatus, the slave control unit transmits the list independently of the system control unit.

3. The apparatus according to claim 1, further comprising a processing device, included in said slave control unit, adapted to process the list in accordance with a display capability of the slave apparatus.

4. The apparatus according to claim 1, wherein said list transmission device transmits partial information of the list stored in the slave control unit, and, when the slave apparatus requests subsequent list information following the partial information, transmits the subsequent list information already stored in the slave control unit to the slave apparatus.

5. The apparatus according to claim 1, wherein when the slave apparatus requests the list, the system control unit transmits, to the slave control unit, list information of all mail messages stored in the system control unit, and, when a mail text is requested, transmits a corresponding mail text to the slave control unit.

6. The apparatus according to claim 1, wherein every time the slave apparatus requests the list, list information stored in the system control unit is read out and re-stored in the slave control unit.

7. A control method for an information processing apparatus having a system control unit which receives email through a line and stores and manages the email, and a slave control unit which controls communication with a slave apparatus, the system control unit and the slave control unit being installed in the same housing, comprising:
    a list request step, of requesting, from the slave control unit to the system control unit, transmission of a mail list in accordance with a request by the slave apparatus, the mail list including information which shows whether the mail text has already been read or is unread;
    a first list transmission step, of transmitting the mail list from the system control unit to the slave control unit in accordance with a request in said list request step;
    a second list transmission step, of transmitting the mail list transmitted in said first list request step from the slave control unit to the slave apparatus;
    a mail text request step, of requesting, from the slave control unit to the system control unit, transmission of mail text in accordance with a request by the slave apparatus;
    a mail text transmission step, of transmitting the corresponding mail text from the system control unit to the slave control unit in accordance with a request in said mail text request step; and,
    a management step, of managing the corresponding mail in the system control unit as a state of already having been read in accordance with the transmission of mail text in said mail text transmission step.

* * * * *

UNITED STATES PATENT AND TRADEMARK OFFICE
CERTIFICATE OF CORRECTION

| | | |
|---|---|---|
| PATENT NO. | : 7,003,552 B2 | Page 1 of 1 |
| APPLICATION NO. | : 10/173588 | |
| DATED | : February 21, 2006 | |
| INVENTOR(S) | : Shinya Kogure et al. | |

It is certified that error appears in the above-identified patent and that said Letters Patent is hereby corrected as shown below:

<u>ON COVER PAGE AT (56) FOREIGN PATENT DOCUMENTS</u>

"2000115440" should read --2000-115440--.

<u>COLUMN 6</u>

Line 46, "and," should read --and--.

Signed and Sealed this

Fifteenth Day of July, 2008

JON W. DUDAS
*Director of the United States Patent and Trademark Office*